United States Patent [19]

Albracht et al.

[11] Patent Number: 4,838,447
[45] Date of Patent: Jun. 13, 1989

[54] PRESSURE RELIEF DEVICE WITH CONICAL REVERSE BUCKLING DISC

[75] Inventors: Karl L. Albracht, Tulsa, Okla.; William J. Walker, Limerick, Ireland

[73] Assignee: BS&B Safety Systems, Inc., Tulsa, Okla.

[21] Appl. No.: 68,110

[22] Filed: Jun. 29, 1987 (Under 37 CFR 1.47)

[51] Int. Cl.⁴ .................. B65D 25/00; F16K 13/04
[52] U.S. Cl. ........................... 220/89 A; 137/68.
[58] Field of Search .................. 220/89 A; 137/68

[56] References Cited

U.S. PATENT DOCUMENTS

| | | |
|---|---|---|
| 2,178,178 | 10/1939 | McKeever ............ 220/89 A |
| 2,553,267 | 5/1951 | Nedoh .................. 220/89 A |
| 2,656,950 | 10/1953 | Coffman . |
| 2,875,921 | 3/1959 | Coffman . |
| 2,953,279 | 9/1960 | Coffman . |
| 2,980,286 | 4/1961 | Coffman . |
| 3,005,573 | 10/1961 | Dawson et al. ........ 220/89 A |
| 3,294,277 | 12/1966 | Wood . |
| 3,463,351 | 8/1969 | Mills . |
| 3,484,817 | 12/1969 | Wood . |
| 3,698,598 | 10/1972 | Wood et al. . |
| 3,722,734 | 3/1973 | Raidl ..................... 220/89 A |
| 3,834,580 | 9/1974 | Ludwig et al. . |
| 3,921,556 | 11/1975 | Wood et al. ........... 220/89 A |
| 4,122,595 | 10/1978 | Wood et al. . |
| 4,278,181 | 7/1981 | Wood et al. . |
| 4,404,982 | 4/1983 | Ou ........................ 220/89 A |
| 4,436,218 | 3/1984 | Beese .................... 220/89 A |
| 4,441,350 | 4/1984 | Short, III et al. . |
| 4,458,516 | 7/1984 | Naumann . |
| 4,481,850 | 11/1984 | Allen . |
| 4,512,171 | 4/1985 | Mozley ................. 220/89 A |
| 4,512,491 | 4/1985 | De Good et al. ...... 220/89 A |
| 4,576,303 | 3/1986 | Mundt et al. . |
| 4,655,070 | 4/1987 | Cliff ..................... 220/89 A |

*Primary Examiner*—George E. Lowrance
*Attorney, Agent, or Firm*—Laney, Dougherty, Hessin & Beavers

[57] ABSTRACT

A safety pressure relief device having a rupture disc with a conical central portion. The relief device comprises inlet and outlet support members wherein the rupture disc is positioned therebetween. The rupture disc has an annular outer flange portion with a conical central portion disposed radially inwardly therefrom. When positioned in the relief device, a tip of the conical portion is directed toward the inlet support member. Scoring is provided on the conical portion for defining at least one line of weakness thereon. In one embodiment, a plurality of linear scores extend radially on the conical portion and are spaced from the tip and base thereof. In another embodiment, the scoring includes a curvilinear score forming an incomplete circle adjacent the base, either spaced therefrom or contiguous therewith. With all embodiments, the rupture disc is adapted for rupturing at relatively low pressures without fragmentation.

28 Claims, 2 Drawing Sheets

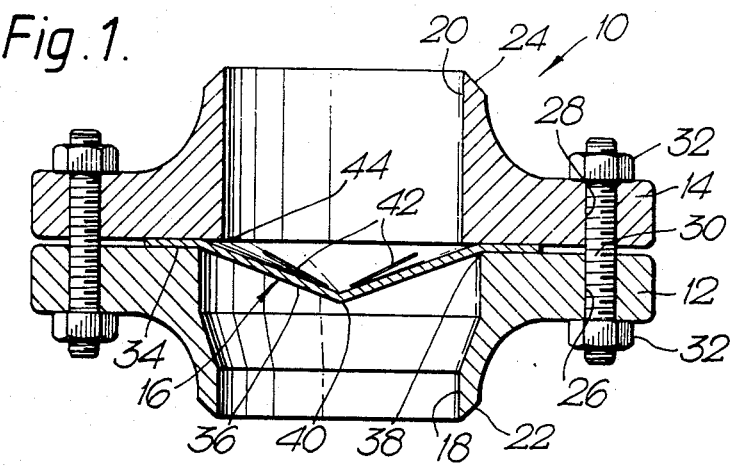
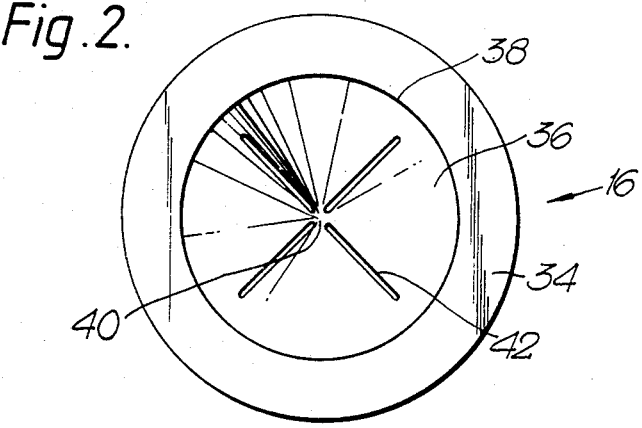
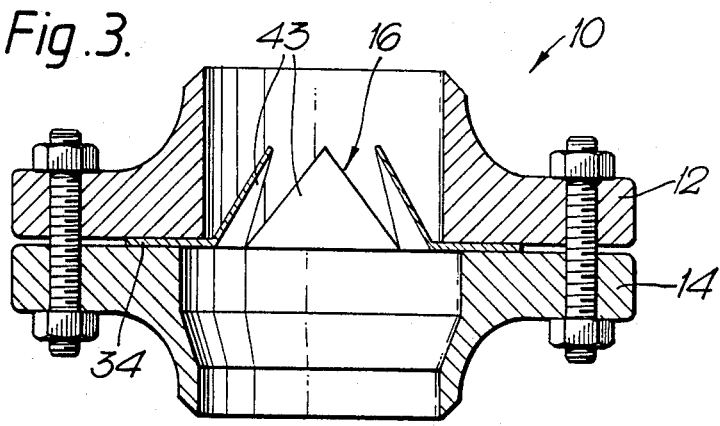

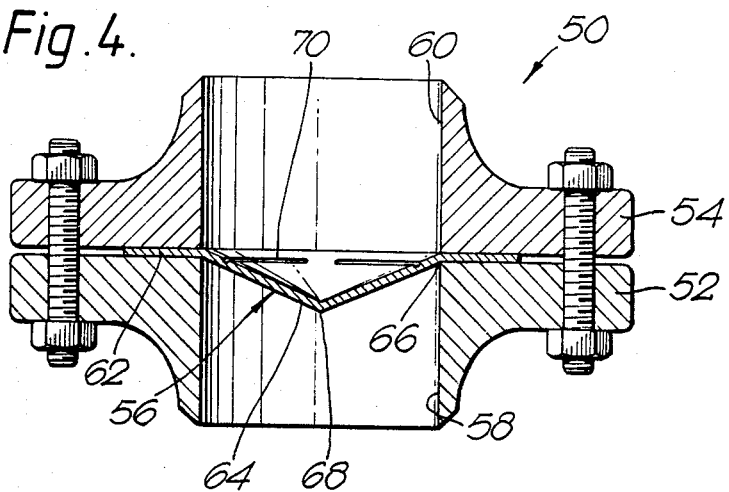
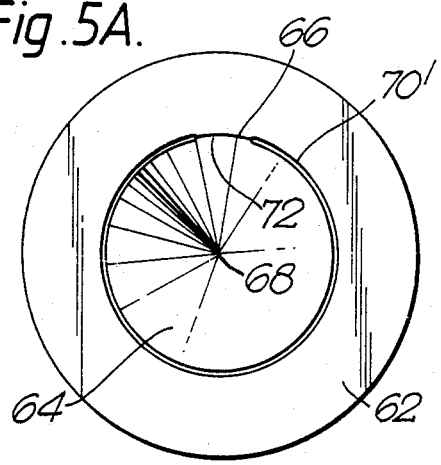
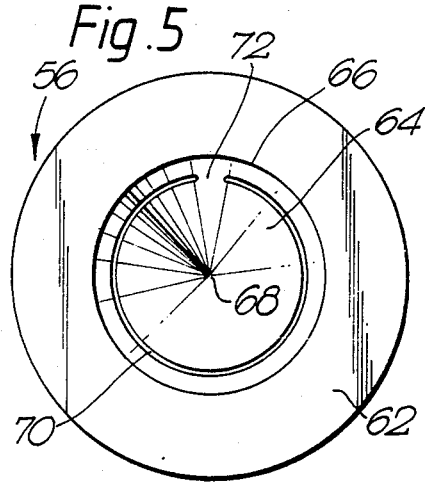
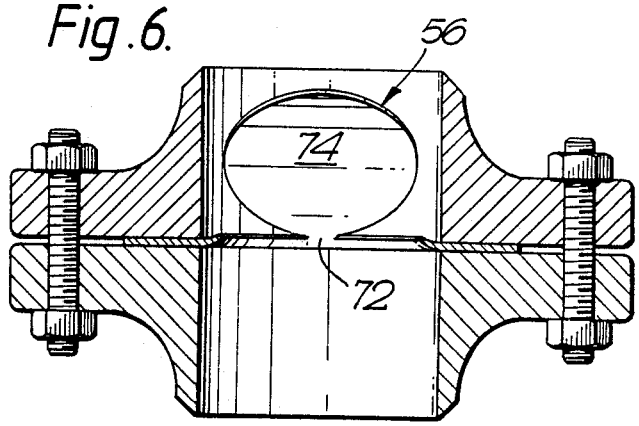

PRESSURE RELIEF DEVICE WITH CONICAL REVERSE BUCKLING DISC

BACKGROUND OF THE INVENTION

1. Field Of The Invention

This invention relates to safety pressure relief devices having reverse buckling discs, and more particularly, to a relief device with a disc having a conical central portion.

2. Description Of The Prior Art

Rupture discs have been used for many years to provide safety pressure relief for pressure vessels or pressurized systems. A problem with early rupture discs was fragmentation of the disc which required cleaning of the fragments of the rupture disc from downstream portions of the system. As a result, discs adapted to rupture without fragmentation were desihned. For relatively high pressure applications, knife blades were necessary to open the thicker rupture discs required. One such apparatus is disclosed in U.S. Pat. No. 3,294,277 to Wood, assigned to the assignee of the present invention. A problem with this type of system is that the knife blade assemblies are costly.

An apparatus providing rupture of a disc without fragmentation at relatively high pressures and without the need of knife blades is disclosed in U.S. Pat. No. 3,484,817 to Wood, also assigned to the assignee of the present invention. This apparatus uses a rupture disc with an annular flat flange and a concave-convex center portion which is positioned between two support members. The concave side of the rupture disc is directed toward the outlet support member. Scoring is privided on the concave-convex center portion for providing lines of weakness thereon. When the inlet pressure exerted on the convex side of the disc reaches a predetermined design level, the elastic stability of the disc becomes unstable causing it to reverse buckle. Upon reversal, the disc will tear along the scoring due to the tensible force exerted on it as a result of the reversing process. The disc thus opens, and, due to the fact that the tearing of the disc occurs along the scoring, no fragmentation occurs.

One limitation to the concave-convex disc shown in U.S. Pat. No. 3,484,817 is that it is not well adapted for relatively low pressures. The relief device of the present invention utilizing a disc having a conical center portion provides a disc which will rupture at relatively low predetermined pressures and still have no fragmentation.

SUMMARY OF THE INVENTION

The safety pressure relief device or apparatus of the present invention comprises inlet support means, outlet support means, and reverse buckling rupture means disposed between the inlet and outlet support means and supported thereby. The rupture means comprises a conical portion with a tip thereof generally facing the inlet support means. Scoring is preferably provided on the disc for creating a line of weakness therein such that the disc is torn along the line of weakness when the rupture means is reversed due to being subjected to a predetermined pressure. In one embodiment, the scoring comprises a plurality of scores extending radially from the tip of the conical portion. In another embodiment, the scoring comprises a curvilinear score adjacent a base of the conical portion, generally forming an incomplete circle. This curvilinear score may be on the conical portion spaced from the base or actually on the base.

The inlet support means is best characterized by an inlet support member defining an inlet opening therethrough and adapted for attachment to a pressure vessel or system. The outlet support means is best characterized by an outlet support member positioned adjacent the inlet support member and defining an outlet opening therethrough substantially coaxial with the inlet opening. The reverse buckling rupture means is preferably characterized by a reverse buckling rupture disc having an annular flange portion and wherein the conical portion is disposed radially inwardly of the flange portion. The conical portion extends across the inlet and outlet openings and is preferably substantially coaxial therewith.

The conical configuration allows the reverse buckling disc to rupture without fragmentation at relatively lower pressures than previously known rupture discs. When a previously determined design pressure in the inlet opening is exerted on the outer side of the disc, the disc will reverse itself an rupture, tearing along the line of weakness formed by the scoring.

An important object of the invention is to provide a safety pressure relief device which will open at a relatively low predetermined pressure.

Another object of the invention is to provide a safety pressure relief device which includes a rupture disc having a conical center portion subjected to pressure on its outer side.

A further object of the invention is to provide a reverse buckling conical rupture disc having scores thereon so that upon reaching a predetermined pressure on its outer side, the disc will reverse itself and tear along the scores without fragmentation.

Additional objects and advantages of the invention will become apparent as the following detailed description of the preferred embodiments is read along with the drawings which illustrate such preferred embodiments.

BRIEF DESCRIPTION OF THE DRAWINGS

FIG. 1 is a cross-sectional view of a first embodiment of the safety pressure relief device of the present invention.

FIG. 2 is a plan view of the outside of the rupture disc used in the embodiment shown in FIG. 1.

FIG. 3 shows a cross section of the apparatus of FIG. 1 after rupture of the disc has occurred.

FIG. 4 is a cross-sectional view of a second embodiment of the safety pressure relief device of the present invention.

FIG. 5 is a plan view of the outside of the rupture disc shown in the embodiment of FIG. 4.

FIG. 5A shows an alternate construction of the rupture disc in FIG. 5.

FIG. 6 shows a cross-sectional view of the apparatus of FIG. 4 after rupture of the disc has occurred.

DETAILED DESCRIPTION OF THE PREFERRED EMBODIMENTS

Referring now to the drawings, and more particularly to FIG. 1, a first embodiment of the safety pressure relief device of the present invention is shown and generally designated by the numeral 10. Device 10 generally includes inlet support member 12, outlet support member 14 adjacent thereto, and rupture disc 16 disposed between the inlet and outlet support members.

Inlet support member 12 defines an inlet opening 18 therethrough, and outlet support member 14 defines an outlet opening 20 therethrough which is substantially coaxial with inlet opening 18. Inlet and outlet support members 12 and 14 are similar to pipe flanges in that they may have necks 22 and 24, respectively, suitable for welding to pipe of substantially the same diameter. Alternatively, inlet and outlet supporting members 12 and 14 may be threaded for receiving threaded pipe or may be constructed so that they may be inserted between two pipe flanges. The method of connection of inlet and outlet support members 12 and 14 is not intended to be limited to the embodiment shown in the drawings.

In operation, inlet support member 12 is connected directly to a pressure vessel nozzle, or to a pipe which is in turn connected to a pressure system, so that fluid pressure within the vessel or system is exerted against rupture disc 16. Outlet support member 14 may be left open to the atmosphere or connected by a pipe to a second vessel or system at a lower pressure level.

In the embodiment shown in FIG. 1, inlet support member 12 defines a plurality of openings 26 therethrough aligned with similar openings 28 in outlet support member 14. Any fastening means known in the art, such as studs 30 and nuts 32 may be used to fasten inlet and outlet support members 12 and 14 together.

Referring now also to FIG. 2, rupture disc 16 comprises an annular flange portion 34 and a conical center portion 36 disposed radially inwardly from the flange portion. A base 38 of conical portion 36 defines a transition between the conical portion and flange portion 34. Preferably, flange portion 34 and conical portion 36 are integrally formed, and rupture disc 16 has a substantially constant cross-sectional thickness.

When postioned in relief device 10, flange portion 38 of rupture disc 16 is clamped between inlet and outlet support members 12 and 14 and supported thereby such that conical portion 36 extends across inlet and outlet openings 18 and 20. A tip 40 of conical portion 36 points in the direction of inlet support member 12. In other words, the outer side of conical portion 36 is directed toward the inlet of device 10. Preferably, conical portion 36 is substantially coaxial with inlet and outlet openigs 18 and 20.

Scoring is provided on disc 10 to provide at least one line of weakness thereon. In the first embodiment shown in FIGS. 1-3, the scoring comprises a plurality of substantially linear scores extending radially on conical portion 36. Preferably, the ends of linear scores 42 terminate at a location on conical portion 36 spaced from tip 40 and base 38. In the preferred embodiment, scores 42 do not intersect at tip 40 so that a high stress concentration is prevented at the tip. Also in the preferred embodiment, four such scores 42 are used which substantially divide conical portion 36 of rupture disc 16 into quadrants.

It will be seen that when rupture disc 16 is postioned in relief device 10 with the outer side of conical portion 36 subjected to fluid pressure, as shown in FIG. 1, the disc will be placed in a state of compression. Disc 16 is preferably formed of sheet material that is self-supporting under normal operating pressures, but the disc will reverse itself and rutpure when fluid pressures exerted on its outer side exceed those for which it was designed. Upon reversal, rupture disc 16 will tear along scores 42 due to the tensile force exerted on it as a result of the reversing process and open, forming a plurality of "petals" 43 in the manner illustrated in FIG. 3. Due to the fact that the tearing of disc 16 occurs along scores 42, no fragmentation of the disc occurs.

Referring again to FIGS. 1 and 3, outlet support member 14 includes a shoulder 44 adjacent the inner end of outlet opening 20. Shoulder 44 has a diameter less than that of base 38 of conical portion 36 of rupture disc 16, and thus, shoulder 44 is radially inwardly spaced from flange portion 34 of the rupture disc. Shoulder 44 provides support for the transition between conical portion 36 and flange portion 34 at base 38 during operation of relief device 10 and prevents premature failure of rupture disc 16 due to stress or fatigue. Shoulder 44 is preferably used with the embodiment of the invention illustrated in FIGS. 1-3. However, there may be conditions under which such a shoulder 44 is not required, and a device similar to that shown in FIG. 1 may be utilized which does not include a shoulder 44. In other words, the invention is not intended to be limited to a device 10 having an outlet support member with a shoulder therein.

Referring now to FIG. 4, a second embodiment of the safety pressure relief device of the present invention is shown and generally designated by the numeral 50. Device 50 generally includes an inlet support member 52, an outlet support member 54 and a rupture disc 56 disposed therebetween. Inlet support member 52 defines an inlet opening 58 therethrough. An outlet support member 54 defines an outlet opening 60 therethrough which is substantially coaxial with inlet opening 58. The method of fastening inlet and outlet support members 12 and 14 together and the method of connecting device 50 to a pressure vessel or pressure system are substantially identical to that shown in the first embodiment.

Referring also to FIG. 5, rupture disc 56 comprises an annular flange portion 62 and a conical central portion 64 formed integrally therewith and disposed radially inwardly therefrom. A base 66 of conical portion 64 defines a transition between conical portion and flange portion 62. When installed as shown in FIG. 4, conical portion 64 extends across inlet and outlet openings 58 and 60 and is substantially coaxial therewith. As with the first embodiment, a tip 68 of rupture disc 56 points in a direction toward inlet support member 52. That is, the outer side of conical portion 64 is directed toward the inlet of device 50.

Rupture disc 56 is substantially identical to rupture disc 16 of the first embodiment except that scoring on rupture disc 56 is in the of curvilinear score 70. Preferably, curvilinear score 70 defines an incomplete circle on conical portion 64 adjacent base 66 such as an unscored gap or solid portion 72 is left. As shown in FIG. 5, scoring 70 is spaced radially inwardly from base 66 on conical portion 64. Alternatively, a curvilinear score 70' may be located in the transition at base 66 as shown in FIG. 5A. That is, score 70' may be contiguous with base 66.

As with the first embodiment, rupture disc 56 of the second embodiment is in compression when subjected to pressure on the inlet side of relief device 50. When the rated rupture pressure is reached, rupture disc 56 will reverse itself and then tear along curvilinear score 70 so that a radially inner portion 74 of rupture disc 56 will lift toward the outlet of device 10 in a fashion similar to the top of a "pop-top" can, as shown in FIG. 6. Rupture disc 56 does not tear at solid portion 72, and thus inner portion 74 is prevented from detaching itself completely. In this way, rupture disc 56 will rupture at a predetermined pressure without fragmentation, just as with the first embodiment.

It can be seen, therefore, that the safety pressure relief device of the present invention is well adapted to carry out the ends and advantages mentioned as well as those inherent therein. While two presently preferred embodiments of the invention have been shown for the purposes of this disclosure, numerous changes in the arrangement and construction of parts may be made by those skilled in the art. All such changes are encompassed within the scope and spirit of the appended claims.

What is claimed is:

1. A pressure relief apparatus comprising:
   inlet support means;
   outlet support means; and
   reverse buckling rupture means disposed between said inlet and outlet support means and supported thereby, said rupture means comprising a self-supporting conical portion with a tip thereof generally facing said inlet support means.

2. The apparatus of claim 1 further comprising scoring on said conical portion for creating a line of weakness therein such that said conical portion is torn along said line of weakness when said rupture means is reversed due to being subjected to a predetermined pressure.

3. The apparatus of claim 2 wherein said scoring comprises a plurality of scores extending radially from sid tip.

4. The apparatus of claim 3 wherein each of said scores is spaced from said tip for preventing a high stress concentration at said tip.

5. The apparatus of claim 2 wherein said scoring comprises a curvilinear score adjacent a base of said conical portion.

6. The apparatus of claim 5 wherein said curvilinear score is spaced from said base.

7. The apparatus of claim 5 wherein said curvilinear score is contiguous with said base.

8. The apparatus of claim 5 wherein said curvilinear scoring defines an incomplete circle.

9. The apparatus of claim 1 wherein:
   said reverse buckling rupture means is characterized by a disc having an annular flange portion; and
   said conical portion is disposed radially inwardly of said flange portion.

10. The apparatus of claim 9 wherein said conical portion and flange portion are integrally formed of a material of substantially constant cross-sectional thickness.

11. A pressure relief apparatus comprising:
    an inlet support member defining an inlet opening therethrough;
    an outlet support member adjacent said inlet support member and defining an outlet opening therethrough substantially coaxial with said inlet opening; and
    a single reverse buckling disc made from a substantially self-supporting material and comprising:
    a flange portion disposed between said inlet and outlet support members; and
    a conical central portion extending across said inlet and outlet openings with an outer sufarce of said conical portion facing said inlet opening.

12. The apparatus of claim 11 wherein said conical portion is substantially coaxial with said inlet and outlet openings.

13. The apparatus of claim 11 wherein said disc further comprises scoring on said conical portion for creating a line of weakness therein.

14. The apparatus of claim 13 wherein said scoring comprises a plurality of substantially linear scores extending radially from a tip of said conical portion.

15. The apparatus of claim 14 wherein each of said scores is spaced from said tip such that a high stress concentration is prevented at said tip.

16. The apparatus of claim 13 wherein said scoring comprises a curvilinear score adjacent a transition between said flange portion and said conical portion.

17. The apparatus of claim 16 wherein said curvilinear score is spaced from said transition.

18. The apparatus of claim 16 wherein said curvilinear score is contiguous with said transition.

19. The apparatus of claim 16 wherein said curvilinear score defines an incomplete circle.

20. The apparatus of claim 11 wherein said outlet support member comprises a shoulder adjacent said outlet opening radially inwardly spaced from said flange portion of said disc.

21. A reverse buckling rupture disc for use between support members in a pressure relief device, said disc comprising:
    an annular flange; and
    an unsupported central conical portion integrally formed with said flange and postioned radially inwardly therefrom;
    wherein, said rupture disc is made from a sheet material which is subtantially self-supporting.

22. The disc of claim 21 wherein said conical portion comprises:
    a tip direct toward an inlet portion of said relief device; and
    a base at a transition between said conical portion and said flange.

23. The disc of claim 22 further comprising scoring for defining lines of weakness thereon.

24. The disc of claim 23 wherein said scoring comprises a plurality of linear scores extending radially between said tip and base of said conical portion.

25. The disc of claim 24 wherein said scores are spaced from said tip and said base for preventing high stress concentrations.

26. The disc of claim 24 wherein said scores substantially divide said conical portion into quadrants.

27. The disc of claim 23 wherein said scoring defines an incomplete circle on said conical portion spaced from said base.

28. The disc of claim 21 wherein said scoring defines an incomplete circle on said base.

* * * * *